United States Patent
Georgin

(10) Patent No.: US 12,134,465 B2
(45) Date of Patent: Nov. 5, 2024

(54) MODIFIED BRAKING SYSTEMS AND METHODS DURING TAXI

(71) Applicant: GOODRICH CORPORATION, Charlotte, NC (US)

(72) Inventor: Marc Georgin, Dayton, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 471 days.

(21) Appl. No.: 17/463,968

(22) Filed: Sep. 1, 2021

(65) Prior Publication Data
US 2023/0067820 A1     Mar. 2, 2023

(51) Int. Cl.
*B64C 25/44*     (2006.01)
*B60T 8/17*     (2006.01)

(52) U.S. Cl.
CPC ............ *B64C 25/44* (2013.01); *B60T 8/1703* (2013.01)

(58) Field of Classification Search
CPC ......... B64C 25/44; B64C 25/48; B64C 25/42; B60T 8/1703; Y02T 50/80
See application file for complete search history.

(56) References Cited

U.S. PATENT DOCUMENTS

| | | | |
|---|---|---|---|
| 6,241,183 B1 * | 6/2001 | Mathieu | B64C 9/12 244/99.11 |
| 8,521,365 B2 | 8/2013 | Chatrenet et al. | |
| 9,658,621 B2 | 5/2017 | Fusaro et al. | |
| 10,065,729 B2 | 9/2018 | Howell et al. | |
| 2004/0155523 A1 * | 8/2004 | Frentz | B60T 8/326 303/155 |
| 2008/0001471 A1 | 1/2008 | Rudd | |
| 2008/0149436 A1 | 6/2008 | Griffith et al. | |
| 2010/0222942 A1 * | 9/2010 | Devlieg | B60T 8/1703 701/3 |
| 2013/0112513 A1 * | 5/2013 | Van Deventer | B60T 13/74 188/106 P |
| 2016/0016661 A1 * | 1/2016 | Howell | B60T 8/00 701/3 |
| 2017/0021936 A1 * | 1/2017 | Nagashima | B64D 31/14 |
| 2021/0049919 A1 | 2/2021 | Davis et al. | |
| 2022/0365531 A1 * | 11/2022 | Howell | G05D 1/0083 |

FOREIGN PATENT DOCUMENTS

WO     2007084449     7/2007

OTHER PUBLICATIONS

European Patent Office, European Search Report dated Jan. 11, 2023 in Application No. 22191975.6.

\* cited by examiner

*Primary Examiner* — Sahar Motazedi
(74) *Attorney, Agent, or Firm* — SNELL & WILMER L.L.P.

(57) ABSTRACT

A method of taxiing an aircraft may comprise: determining, via a brake controller, whether the aircraft is taxiing with a first thrust provided from a first side of the aircraft, a second thrust from a second side of the aircraft, or both the first thrust and the second thrust; and modifying, via the brake controller, a first brake pressure supplied to a first brake disposed on the first side of the aircraft as a function of pedal deflection in response to the taxiing with the first thrust only.

16 Claims, 5 Drawing Sheets

MODIFIED BRAKING SYSTEMS AND METHODS DURING TAXI

FIELD

The present disclosure relates to control systems and methods modifying braking and, more particularly, modifying braking systems and method during single engine taxi.

BACKGROUND

Many aircraft include landing gear having wheel assemblies to allow the aircraft to travel along the ground during taxi, takeoff, and landing. Sometimes, one engine may be completely shut off or remain idle during taxi for an aircraft. This operation may induce a yaw in the motion of the aircraft that a pilot may steer to counteract or utilize differential braking.

SUMMARY

A method of taxiing an aircraft is disclosed herein. The method may comprise: determining, via a brake controller, whether the aircraft is taxiing with a first thrust provided from a first side of the aircraft, a second thrust from a second side of the aircraft, or both the first thrust and the second thrust; and modifying, via the brake controller, a first brake pressure supplied to a first brake disposed on the first side of the aircraft as a function of pedal deflection in response to the taxiing with the first thrust only.

In various embodiments, modifying the first brake pressure further comprises supplying a first pressure that is greater than a second pressure, the second pressure corresponding to a second brake pressure supplied to the first brake during normal operation. Modifying the first brake pressure may comprise augmenting the first brake pressure over a predetermined range of pedal displacement. The predetermined range of pedal displacement may be above an idle pedal threshold. Modifying the first brake pressure supplied to the first brake may be configured to counteract a yaw of the aircraft from the first thrust. Augmenting the first brake pressure may comprise modifying a pressure difference between the first brake pressure and a second brake pressure supplied to the first brake as a function of pedal displacement. The pressure difference may increase over a predetermined pedal displacement range extending from a first pedal displacement to a second pedal displacement.

An article of manufacture is disclosed herein. The article of manufacture may include a tangible, non-transitory computer-readable storage medium having instructions stored thereon that, in response to execution by a processor, cause the processor to perform operations comprising: determining, by the processor, that a first engine on a first side of an aircraft is being used for taxiing and a second engine on a second side of the aircraft is shut down or in an idle state; and modifying, by the processor, a first brake pressure supplied to a first brake disposed on the first side of the aircraft as a function of pedal displacement.

In various embodiments, the first brake pressure is greater than a second brake pressure supplied to the first brake in an un-modified state, the first brake pressure being greater than the second brake pressure over a predetermined pedal displacement range. The operations may further comprise receiving a first angle of a first thrust lever associated with the first engine and a second angle of a second thrust lever associated with the second engine. The second angle may be approximately zero. Modifying the first brake pressure may include augmenting the first brake pressure over a predetermined range of pedal displacement. The predetermined range of pedal displacement may be above an idle pedal threshold. Augmenting the first brake pressure supplied to the first brake may be configured to counteract a yaw of the aircraft from the first engine.

A brake system for an aircraft is disclosed herein. The brake system may comprise: a first brake assembly configured to be disposed on a first side of the aircraft, the first brake assembly configured to supply a first brake pressure in response to a first pedal being displaced; a second brake assembly configured to be disposed on a second side of the aircraft, the second brake assembly configured to supply a second brake pressure in response to a second pedal being displaced; and a brake controller configured to control the first brake pressure and the second brake pressure, the brake controller further configured to: determine the aircraft is taxiing via thrust supplied only on the first side of the aircraft, and modify the first brake pressure as a function of pedal displacement in response to determining the aircraft is taxiing via thrust supplied only on the first side of the aircraft.

In various embodiments, the brake system further comprises a first servo valve and a second servo valve, the first servo valve corresponding to the first brake assembly, the second servo valve corresponding to the second brake assembly. Modifying the first brake pressure may further comprise commanding a first hydraulic pressure be supplied by the first servo valve that is greater than a second hydraulic pressure supplied by the first servo valve during a normal braking operation. The brake system may further comprise a first throttle corresponding to a first engine and a second throttle corresponding to a second engine, wherein determining the aircraft is taxiing via thrust supplied on the first side of the aircraft is determined from receiving a first thrust angle of the first throttle and a second thrust angle of the second throttle. Modifying the first brake pressure supplied to the first brake assembly may be configured to counteract a yaw of the aircraft during taxiing. The brake controller may be further configured to determine the aircraft is taxiing.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

Figure 1:
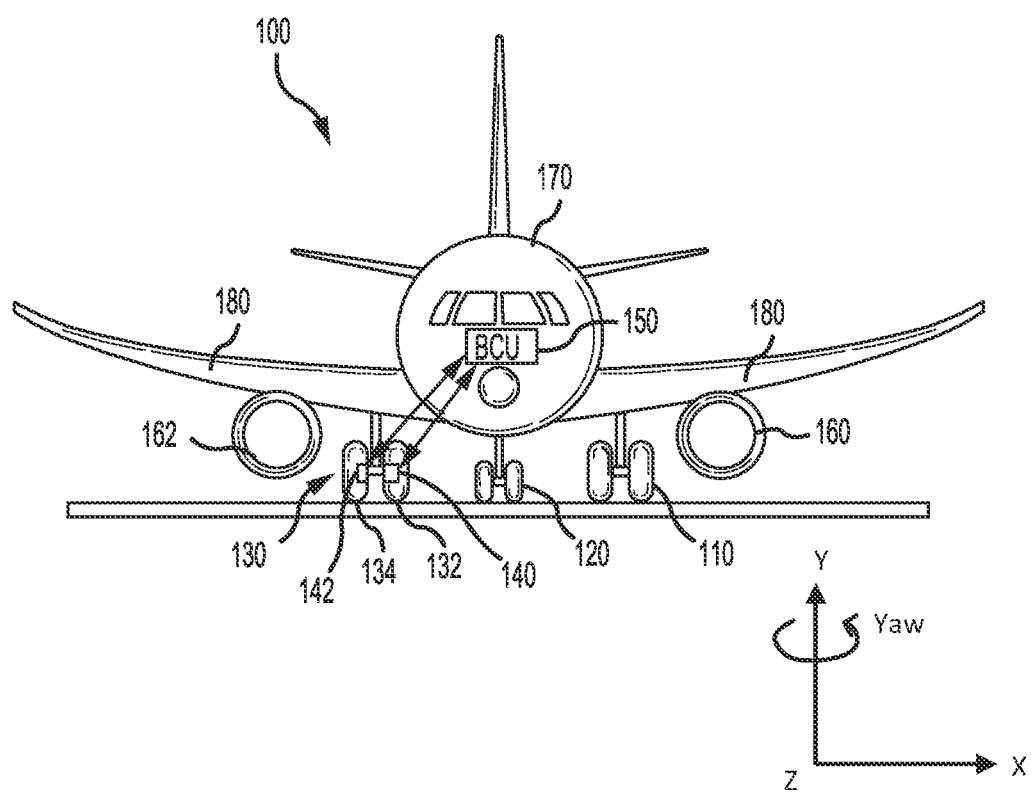
FIG. 1 illustrates an aircraft having multiple landing gear and brakes, in accordance with various embodiments.

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In order to save fuel, airlines often operate aircrafts with only one engine during taxi. In some cases, one engine is completely shut off. In other cases, one engine remains idle and the other engine provides the thrust to attain taxi speeds. The single engine taxi operation induces a yaw in the motion of the aircraft. To counteract the yaw in the aircraft, the pilot may use steering and/or increased differential braking correction. For example, a pilot may utilize more brake pressure on the right brake if the right engine is used to counteract the yaw.

In order to maintain a straight line while braking and using only one engine for taxiing, the systems and methods disclosed herein can be utilized. In various embodiments, the method includes modifying the pedal to pressure curve based on which engine is in use, how much thrust is supplied by the engine to the aircraft, and an aircraft speed. If the left engine is used, the left pedal curve is modified to compensate aircraft yaw. Conversely, if the right engine is used, the right pedal curve is modified. Under normal conditions, the left and right curves are the same. With the methods and systems disclosed herein, the left or right curve is now scaled to compensate for the yaw induced by the engine thrust applied. For example, if the aircraft is taxiing with the right engine only, the right pedal curve is modified to compensate for this dissymmetry.

In various embodiments, the left or right pedal curve is scaled to compensate for the yaw induced by the engine thrust applied. This allows the pilot to press pedals as in a typical manner, with the brake system compensating automatically, and obtain a deceleration of the aircraft, while maintaining a straight path for the aircraft. The pilot does not have to compensate for the yaw of the aircraft, as the brake system compensates for the yaw accordingly. The methods and systems disclosed herein also provide a similar feel and response for differential braking relative to typical taxiing. The pilot does not have to compensate with extra pedal deflection on the side corresponding to the engine in use for taxi, in accordance with various embodiments.

Referring now to FIG. 1, an aircraft 100 in accordance with various embodiments can include multiple landing gears including a first landing gear 110, a second landing gear 120, and a third landing gear 130. Each landing gear may include one or more wheel assemblies. For example, the third landing gear 130 includes an inner wheel assembly 132 and an outer wheel assembly 134.

The aircraft 100 may further include one or more brakes coupled to each wheel assembly. For example, a first brake 140 may be coupled to the inner wheel assembly 132, and a second brake 142 may be coupled to the outer wheel assembly 134. The first brake 140 may apply a braking force to the inner wheel assembly 132 upon receiving a brake command. Similarly, the second brake 142 may apply a braking force to the outer wheel assembly 134 upon receiving a brake command.

The aircraft 100 may further include a brake control unit (BCU) or brake controller 150. The brake controller 150 may include one or more processors and one or more tangible, non-transitory memories and be capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. In various embodiments, the brake controller 150 may be specifically designed for controlling operation of aircraft brakes. The brake controller 150 may control operation of the first brake 140 and the second brake 142 under normal operating conditions.

The aircraft 100 further comprises a first gas turbine engine 160 and a second gas turbine engine 162. Although described herein with respect to gas turbine engines 160, 162, the present disclosure is not limited in this regard. For example, electric engines, hydrogen engines, gas turbine engines, or any combination may be within the scope of this disclosure. The first gas turbine engine 160 and the second gas turbine engine 162 are disposed on opposite sides of a fuselage 170 of the aircraft 100. Although illustrated as being coupled to wings 180 of the aircraft 100, the present disclosure is not limited in this regard. For example, gas turbine engines 160, 162 may be coupled to the fuselage 170, in accordance with various embodiments. The gas turbine engines 160, 162 may be controlled by a pilot (such as by controlling throttles 212, 312 from FIG. 2 in a cockpit) to generate thrust to accelerate the aircraft 100. In various embodiments, the first gas turbine engine 160 is on a left side of the aircraft 100 and the second gas turbine engine 162 is on a right side of the aircraft 100. Left and right as disclosed herein refer to a direction determined from a center of the fuselage 170 while facing a forward direction (i.e., a direction defined from a tail to a front end of aircraft 100).

Figure 2:
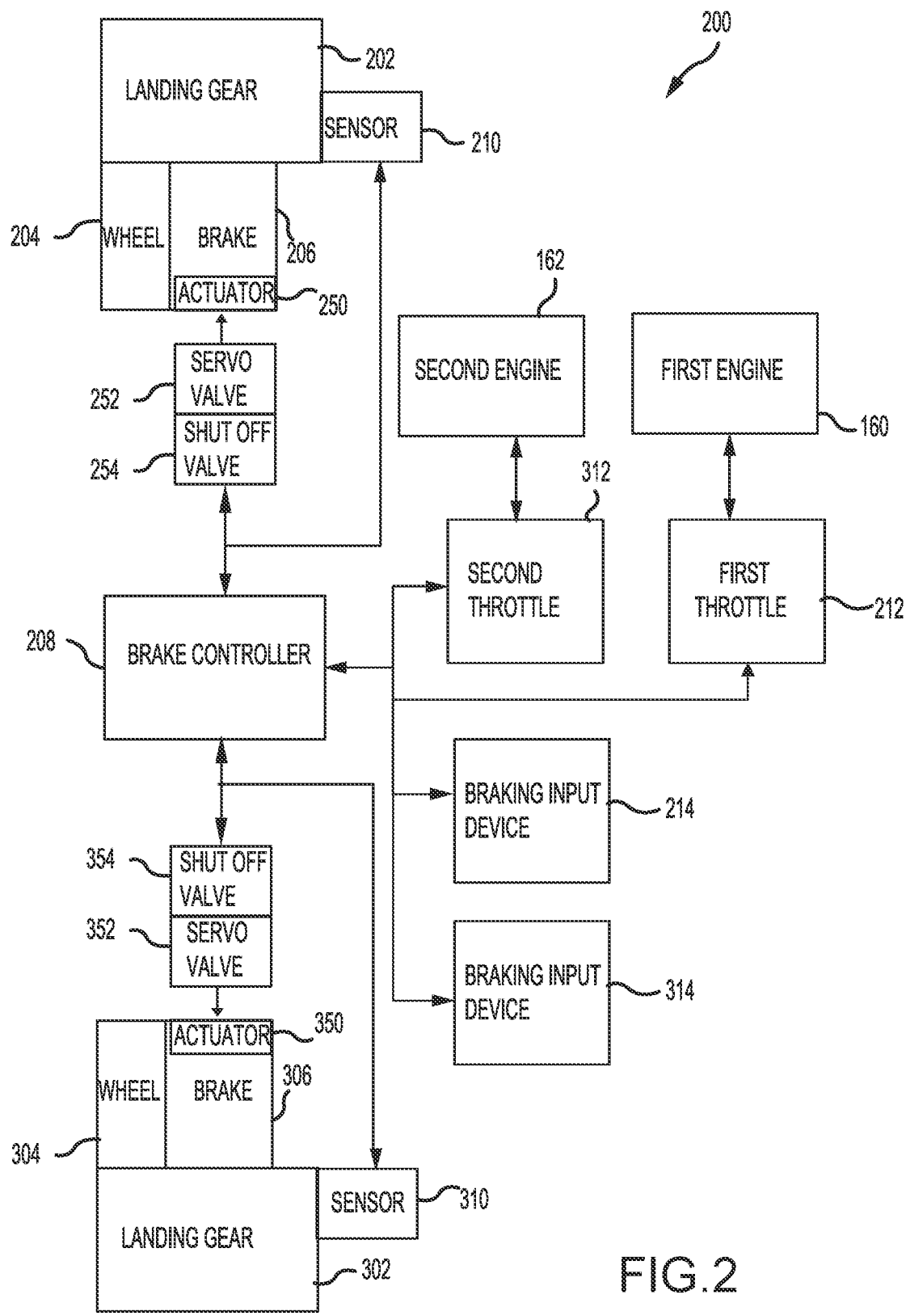
FIG. 2 illustrates a system for controlling a brake by using a servo valve, in accordance with various embodiments.

Referring now to FIG. 2, a system 200 adaptable for facilitating single engine taxi of an aircraft brake system, is illustrated in accordance with various embodiments. The single engine taxiing may be performed automatically via system 200. The system 200 may be implemented in an aircraft such as the aircraft 100 of FIG. 1. The system 200 may include at least two landing gear 202, 302 that includes at least one wheel or wheel assembly 204, 304 per landing gear 202, 302. The system 200 may further include an actuator 250 fluidly coupled to a servo valve 252 and a shut off valve 254 associated with the first landing gear 202, and an actuator 350 fluidly coupled to a servo valve 352 and a shut off valve 354. The actuators 250, 350 are designed to apply force to a respective brake assembly (e.g., brake 206 or brake 306 respectively) in response to a hydraulic pressure being provided to the actuator 250, 350 via the servo valve 252, 352, which may in turn apply torque to, and reduce rotational velocity of, the wheel assembly 204, 304. The system 200 may also include a brake controller 208 designed to control operation of the servo valves 252, 352 and shut off valves 254, 354.

The system 200 may further include a sensor 210 associated with the first landing gear 202 and a sensor 310 associated with the second landing gear 302. The sensors 210, 310 are designed to detect whether the aircraft is on the ground. For example, the sensors 210, 310 may include a weight on wheels (WoW) sensor coupled to the landing gear 202, 302 and configured to detect a force on wheel assembly 204, 304 to signify the aircraft (e.g., aircraft 100) is on the ground and provide an input to the brake controller 208. Although illustrated as being coupled to the landing gear 202, the sensor 210 is not limited in this regard. Although illustrated as including multiple sensors 210, 310, a single WoW sensor is within the scope of this disclosure.

The system 200 may further include the first gas turbine engine 160 and the second gas turbine engine 162, a first throttle 212, a second throttle 312, a first braking input device 214, and a second braking input device 314. In a single engine taxiing process, only one of the engines 160, 162 may generate thrust to propel a corresponding aircraft, while the other engine may be in an off state or an idle state. The throttles 212, 312 may each include a thrust input device, such as a joystick, thrust lever, or other input device, which may be used to request power from the first gas turbine engine 160 or second gas turbine engine 162 respectively.

The braking input devices 214, 314 may include an input devices which may be used to manually control braking of the brakes 206, 306. For example, the braking input devices 214, 314 may include emergency handles, pilot pedals, or the like. In various embodiments, the braking input devices 214, 314 comprise pilot pedals.

Figure 3:
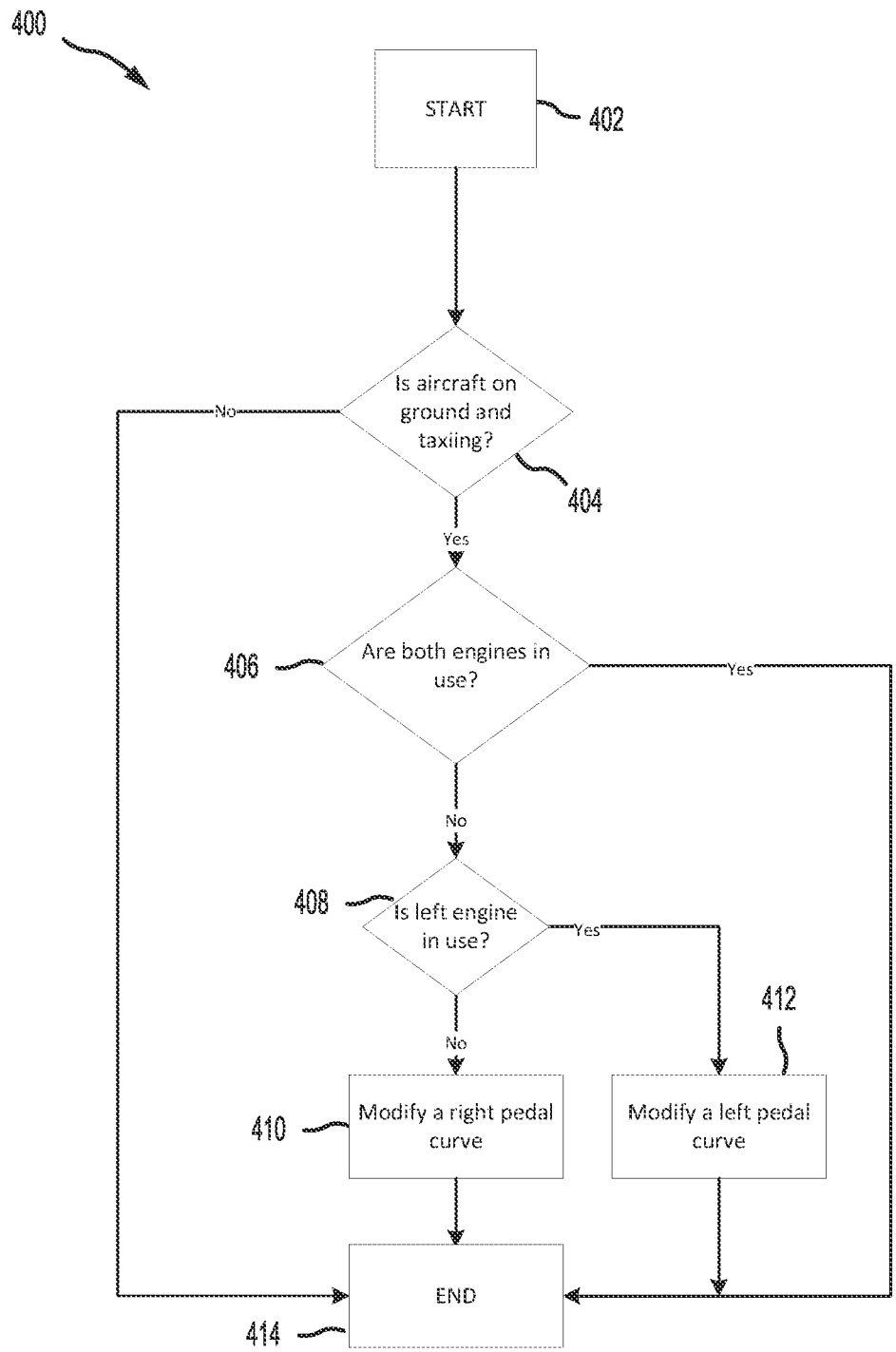
FIG. 3 illustrates a method for single engine taxiing of an aircraft, in accordance with various embodiments.

Referring now to FIGS. 2 and 3, a method 400 of the brake controller 208 may include logic for controlling operation of the brakes 206, 306. The method 400 starts in block 402 and proceeds to determine if the aircraft 100 from FIG. 1 is on the ground and taxiing (block 404). For example, the brake controller 208 may make this determination in response to receiving an aircraft speed from a speed sensor or the like and comparing the aircraft speed to a predetermined threshold. For example, the brake controller 208 may determine the aircraft is taxiing in response to an aircraft speed being between 5 knots and 35 knots, or between 10 knots and 30 knots, in accordance with various embodiments. In various embodiments, the brake controller 208 may determine the aircraft 100 from FIG. 1 is on the ground in response to receiving an indication that landing gear 202, 302 both have a weight on wheels from sensors 210, 310.

The method 400 further comprises determining whether engines 160, 162 are both in use (block 406). For example, the brake controller 208 may determine whether engines 160, 162 are both in use base on receiving a signal from a sensor configured to measure an angle of a thrust lever for the throttles 212, 312. In this regard, the angle of the thrust lever may correspond to a thrust force provided by a respective engine (e.g., engines 160, 162). An angle of between 0 and 5 degrees may indicate an engine is in idle. In various embodiments, an engine being off may be determined from receiving an indication from an avionics system that a respective engine is shut down.

The method 400 further comprises proceeding to an end block (block 414) in response to both engines being in use. In response to determining only one engine is in use, the method 400 further comprises determining whether the left engine is in use (block 408). If the left engine is in use, the method 400 further comprises modifying a left pedal curve (block 412). If the right engine is in use, the method 400 further comprises modifying a right pedal curve (block 410). In various embodiments, modifying the pedal curve (i.e., a left pedal curve or a right pedal curve) may include augmenting the pedal curve of a pedal being augmented based on a pedal deflection as described further herein. "Augmenting" as defined herein refers to increasing a pressure provided by the servo valve relative to a typical supply pressure provided by the servo valve during normal braking to an increased supply pressure provided by the servo valve. As described further herein, the increased supply pressure provided by the servo valves corresponds to a constant pressure supplied for a respective brake pedal deflection. As the brake pedal deflection increases the constant pressure supplied to the brake from the servo valves may increase at a constant rate, at an increased rate, or at a decreased rate relative to typical pedal deflection as described further herein, in accordance with various embodiments.

For example, under normal taxiing, where both engines are in use, a left pedal curve and a right pedal curve may be the same. In contrast, augmenting a left pedal curve (in accordance with block 412) or a right pedal curve (in accordance with block 410) may include providing a greater brake pressure to a pedal curve being modified relative to a typical pressure of the pedal curve being modified (i.e., during normal operation with both engines).

In various embodiments, a brake pressure supplied to the brake (e.g., brake 206 or brake 306) being augmented is scaled to compensate for the yaw (i.e., rotation about a vertical axis Y as shown in FIG. 1) induced by the engine being operated being used during taxi (e.g., first gas turbine engine 160 or second gas turbine engine 162 from FIGS. 1 and 2). In various embodiments, the offset may be a delta pressure defined over a predetermined range of brake displacement.

Figure 4:
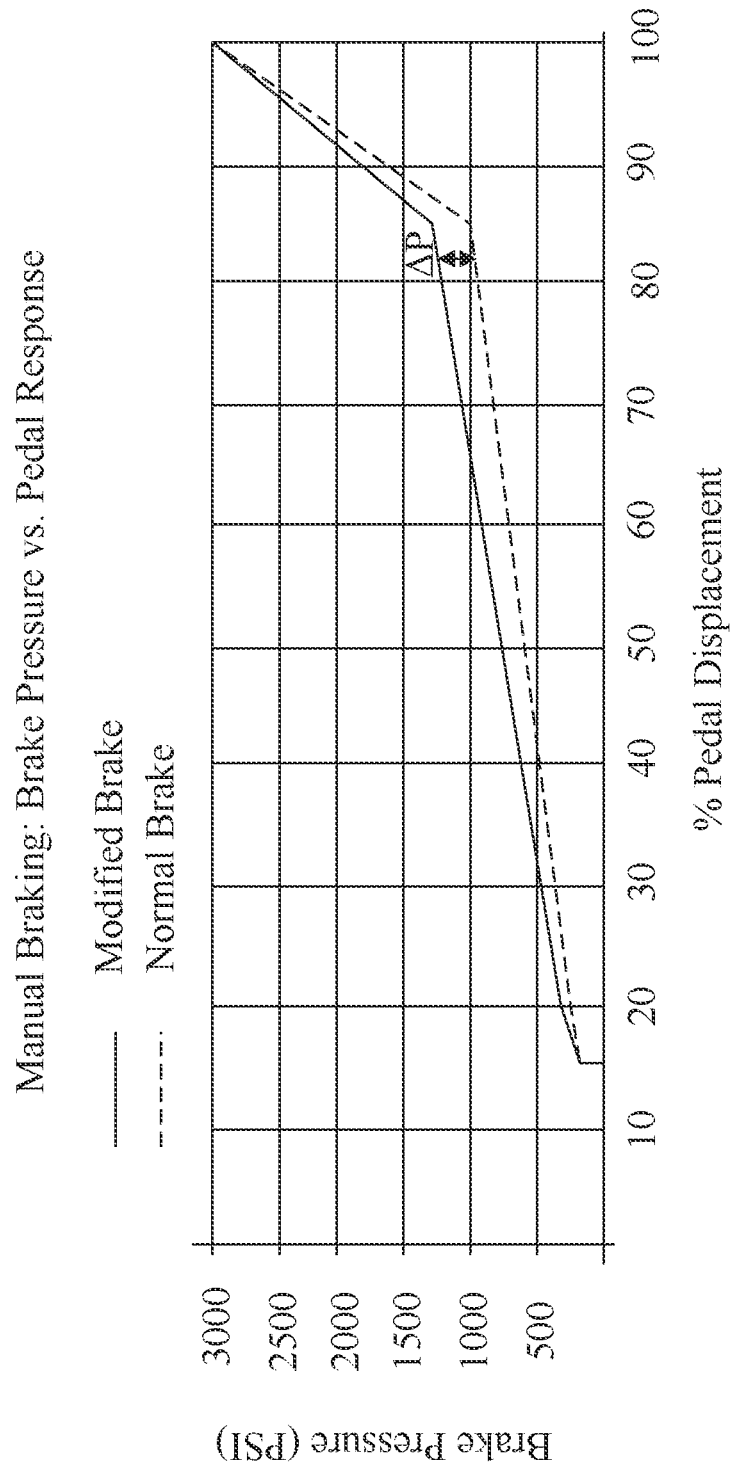
FIG. 4 illustrates a brake pressure vs. pedal response curve for a single engine taxiing method, in accordance with various embodiments; and, FIG. 5 illustrates a brake pressure vs. pedal response curve for a single engine taxiing method, in accordance with various embodiments.

In various embodiments, a brake pressure supplied to the brake (e.g., brake 206 or brake 306) being augmented is augmented in accordance with FIG. 4. For example, a first range of pedal displacement (e.g., from 0% to 15%) may provide the same amount of brake pressure (e.g., approximately 0 pounds per square inch (PSI)), then a remaining range of pedal displacements (e.g., 15% to 100%) may be scaled in some manner. In various embodiments, the first range may end a pedal idle threshold (i.e., an initial amount of displacement where no brake pressure is applied).

One skilled in the art may recognize various manners of scaling brake pressure as a function of pedal displacement after the pedal idle threshold and remain within the scope of this disclosure. For example, a change in pressure ΔP may increase from a first pedal displacement to a second pedal displacement (i.e., between 15%-20%). In this regard, the first pedal displacement may correspond to the pedal idle threshold for a first brake pressure. In various embodiments, the brake pressure may be the same for the brake in an augmented state and in an un-augmented state at the pedal idle threshold and a rate of pressure increase may be greater for the augmented state relative to a rate of pressure increase for the un-augmented state over the first predetermined range (e.g., between 15% and 20%).

In various embodiments, over a second predetermined range of pedal displacement (e.g., between 20% and 85%), a rate of change of brake pressure of the augmented brake as a function of pedal displacement may be greater than a rate of change of brake pressure of the un-augmented brake.

Stated another way, the change in pressure between the augmented brake and the un-augmented brake for a respective pedal displacement may increase as a percent pedal displacement increases, in accordance with various embodiments.

In various embodiments, over a third predetermined range of pedal displacement (e.g., between 85% and 100%), a brake pressure of the augmented brake and a brake pressure of the un-augmented brake may converge at a maximum brake pressure at 100% pedal displacement, in accordance with various embodiments.

Figure 5:
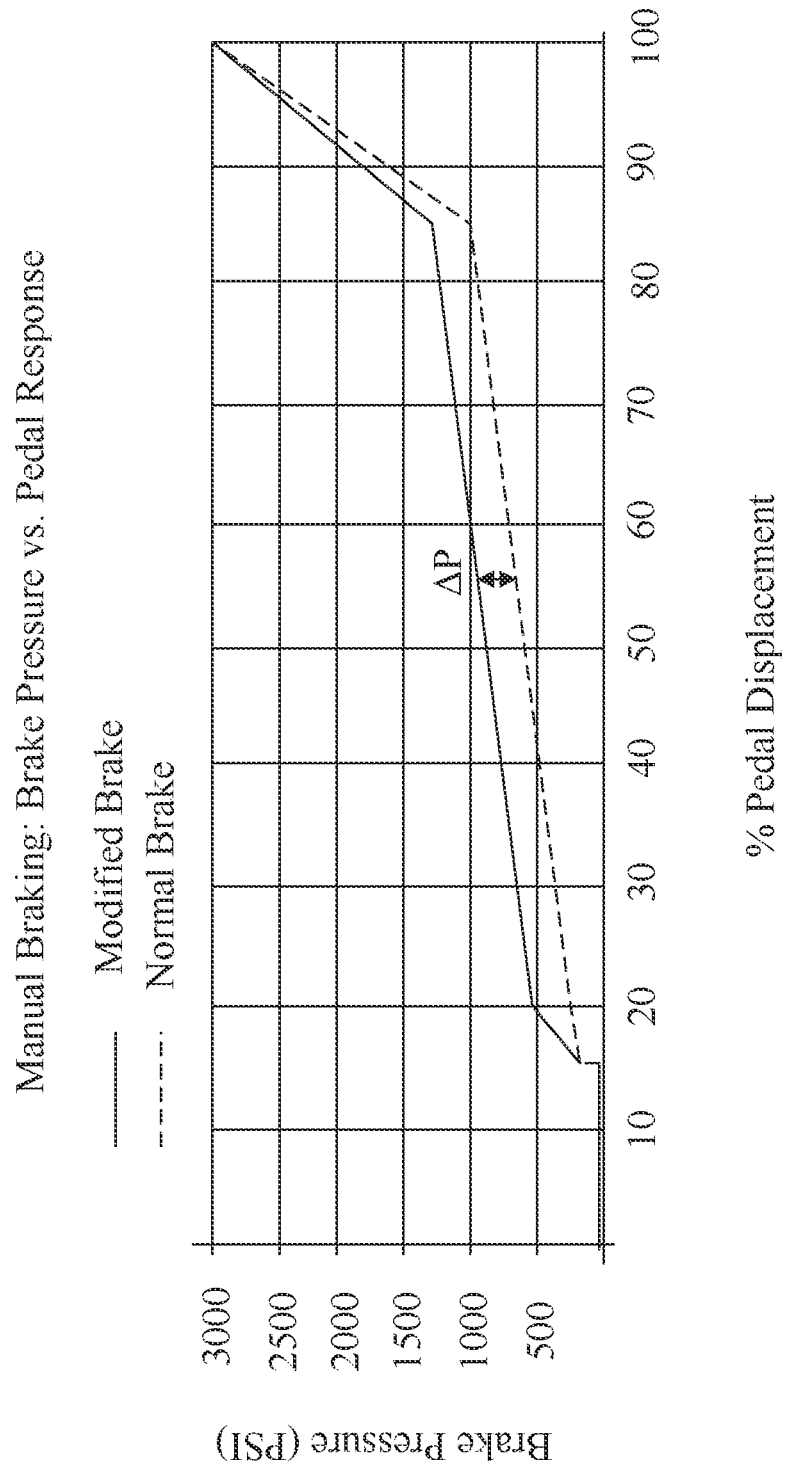

Referring now to FIG. 5, in various embodiments, over the second predetermined range of pedal displacements, a change in pressure from the augmented brake relative to the un-augmented brake may remain constant for a respective pedal displacement. For example, the augmented brake may receive an additional 200 PSI brake pressure relative to the un-augmented brake in the second predetermined range (e.g., between 20% and 85%). FIGS. 4 and 5 are shown to illustrate potential exemplary embodiments; however, the present disclosure is not limited in this regard. Various pedal curve modifications could be utilized and be within the scope of this disclosure.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of taxiing an aircraft, the method comprising:
   receiving, via a brake controller, a first thrust angle of a first throttle and a second thrust angle of a second throttle;
   determining, via the brake controller and based on the first thrust angle and the second thrust angle, whether the aircraft is taxiing with a first thrust from a first engine provided on a first side of the aircraft, a second thrust from a second engine provided on a second side of the aircraft, or both the first thrust and the second thrust; and
   responsive to determining that the aircraft is taxiing with the first thrust only, modifying, via the brake controller, a first brake pressure supplied to a first brake disposed on the first side of the aircraft as a function of pedal displacement by controlling operation of a servo valve to supply, a first pressure at a first pedal displacement during taxiing with the first thrust only that is greater than a second pressure supplied at the first pedal displacement during normal taxiing.

2. The method of claim 1, wherein modifying the first brake pressure comprises augmenting the first brake pressure over a predetermined range of pedal displacement.

3. The method of claim 2, wherein the predetermined range of pedal displacement is above an idle pedal threshold.

4. The method of claim 1, wherein modifying the first brake pressure supplied to the first brake is configured to counteract a yaw of the aircraft from the first thrust.

5. The method of claim 1, wherein modifying the first brake pressure comprises modifying the first brake pressure by a pressure difference.

6. The method of claim 5, wherein the pressure difference increases over a predetermined pedal displacement range extending from a smaller pedal displacement to a larger pedal displacement.

7. An article of manufacture including a tangible, non-transitory computer-readable storage medium having instructions stored thereon that, in response to execution by one or more processors, cause the one or more processors to perform operations comprising:
   receiving a first thrust angle of a first throttle and a second thrust angle of a second throttle;
   determining, based on the first thrust angle and the second thrust angle, that a first engine on a first side of an aircraft is being used for taxiing and a second engine on a second side of the aircraft is shut down or in an idle state for taxiing; and
   responsive to determining that the first engine is being used for taxiing and the second engine is shut down or in the idle state for taxiing, modifying a first brake pressure supplied to a first brake disposed on the first side of the aircraft as a function of pedal displacement by controlling operation of a servo valve to supply a first pressure at a first pedal displacement during taxiing with the first engine being used and the second engine being shut down or in the idle state that is greater than a second pressure supplied at the first pedal displacement during normal taxiing.

8. The article of manufacture of claim 7, wherein the first thrust angle is associated with the first engine and the second thrust angle is associated with the second engine.

9. The article of manufacture of claim 8, wherein the second thrust angle is approximately zero.

10. The article of manufacture of claim 7, wherein modifying the first brake pressure includes augmenting the first brake pressure over a predetermined range of pedal displacement.

11. The article of manufacture of claim 10, wherein the predetermined range of pedal displacement is above an idle pedal threshold.

12. The article of manufacture of claim 7, wherein modifying the first brake pressure supplied to the first brake is configured to counteract a yaw of the aircraft from the first engine.

13. A brake system for an aircraft, comprising:
a first servo valve;
a first braking input device including a first pedal;
a second braking input device including a second pedal;
a first throttle corresponding to a first engine and a second throttle corresponding to a second engine;
a first brake assembly configured to be disposed on a first side of the aircraft, the first brake assembly configured to supply a first brake pressure through operation of the first servo valve in response to the first pedal being displaced;
a second brake assembly configured to be disposed on a second side of the aircraft, the second brake assembly configured to supply a second brake pressure in response to the second pedal being displaced; and
a brake controller configured to control the first brake pressure and the second brake pressure, the brake controller further configured to:
receive a first thrust angle of the first throttle and a second thrust angle of the second throttle,
determine, based on the first thrust angle and the second thrust angle, whether the aircraft is taxiing via thrust supplied only on the first side of the aircraft, supplied only on the second side of the aircraft, or supplied on both the first side and the second side of the aircraft, and
responsive to determining the aircraft is taxiing via thrust supplied only on the first side of the aircraft, modify the first brake pressure supplied to a first brake disposed on the first side of the aircraft as a function of pedal displacement by controlling operation of the first servo valve to supply a first pressure at a first pedal displacement during taxiing via thrust supplied only on the first side of the aircraft that is greater than a second pressure supplied at the first pedal displacement during normal taxiing.

14. The brake system of claim 13, further comprising a second servo valve, the second servo valve corresponding to the second brake assembly.

15. The brake system of claim 13, wherein modifying the first brake pressure supplied to the first brake is configured to counteract a yaw of the aircraft during taxiing.

16. The brake system of claim 13, wherein the brake controller is further configured to determine the aircraft is taxiing.

* * * * *